United States Patent
Kim et al.

(10) Patent No.: US 11,476,051 B2
(45) Date of Patent: Oct. 18, 2022

(54) MULTILAYER CERAMIC ELECTRONIC COMPONENT AND MANUFACTURING METHOD THEREOF

(71) Applicant: SAMSUNG ELECTRO-MECHANICS CO., LTD., Suwon-si (KR)

(72) Inventors: Bum Soo Kim, Suwon-si (KR); Jin Soo Park, Suwon-si (KR); Duk Hyun Chun, Suwon-si (KR); Myung Jun Park, Suwon-si (KR); Yeon Song Kang, Suwon-si (KR); Jong Ho Lee, Suwon-si (KR); Hyun Hee Gu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 121 days.

(21) Appl. No.: 16/850,557

(22) Filed: Apr. 16, 2020

(65) Prior Publication Data

US 2021/0217560 A1  Jul. 15, 2021

(30) Foreign Application Priority Data

Jan. 9, 2020  (KR) .................. 10-2020-0002913

(51) Int. Cl.
*H01G 4/30* (2006.01)
*H01G 4/12* (2006.01)
*H01G 4/012* (2006.01)

(52) U.S. Cl.
CPC ............... *H01G 4/30* (2013.01); *H01G 4/012* (2013.01); *H01G 4/1218* (2013.01)

(58) Field of Classification Search
CPC ...... H01G 4/248; H01G 4/012; H01G 4/1209; H01G 4/232; H01G 4/30; H01G 4/0085;
(Continued)

(56) References Cited

U.S. PATENT DOCUMENTS

| 2015/0022943 A1* | 1/2015 | Chae ....................... H01G 4/232 |
| | | 361/301.4 |
| 2015/0043124 A1* | 2/2015 | Kim ....................... H01G 4/232 |
| | | 361/301.4 |

(Continued)

FOREIGN PATENT DOCUMENTS

| JP | 2019-117899 A | 7/2019 |
| KR | 10-2018-0028237 A | 3/2018 |
| KR | 10-2019-0006883 A | 1/2019 |

*Primary Examiner* — Michael P McFadden
(74) *Attorney, Agent, or Firm* — Morgan, Lewis & Bockius LLP (57) ABSTRACT

A multilayer ceramic electronic component includes a ceramic body having a capacitance forming portion including dielectric layers and first and second internal electrodes laminated with respective dielectric layers interposed therebetween, a first external electrode connected to the first internal electrode and including a first conductive layer and a first band portion, and a second external electrode connected to the second internal electrode and including a second conductive layer and a second band portion. Tb/Tc is 0.85 or more, where Tc is a maximum thickness of each of the first and second conductive layers and Tb is a maximum thickness of each of the first and second band portions.

12 Claims, 4 Drawing Sheets

(58) Field of Classification Search
CPC .... H01G 4/1227; H01G 4/2325; H01G 4/065; H01G 4/005; H01G 4/1218; H01G 4/181
See application file for complete search history.

(56) References Cited

U.S. PATENT DOCUMENTS

| | | | | |
|---|---|---|---|---|
| 2015/0083475 | A1* | 3/2015 | Kim | H01G 2/06 29/25.42 |
| 2015/0223340 | A1* | 8/2015 | Jung | H01G 4/012 156/89.12 |
| 2015/0380161 | A1* | 12/2015 | Lim | C23C 14/34 156/89.12 |
| 2017/0154729 | A1* | 6/2017 | Lee | H01G 4/012 |
| 2018/0068795 | A1 | 3/2018 | Park et al. | |
| 2018/0082792 | A1* | 3/2018 | Satoh | H01G 4/232 |
| 2019/0019624 | A1* | 1/2019 | Oh | H01G 4/30 |
| 2019/0371528 | A1* | 12/2019 | Takashima | H01G 4/228 |

* cited by examiner

MULTILAYER CERAMIC ELECTRONIC COMPONENT AND MANUFACTURING METHOD THEREOF

CROSS-REFERENCE TO RELATED APPLICATION(S)

This application claims the benefit under 35 USC 119(a) of Korean Patent Application No. 10-2020-0002913 filed on Jan. 9, 2020 in the Korean Intellectual Property Office, the entire disclosure of which is incorporated herein by reference for all purposes.

TECHNICAL FIELD

The present disclosure relates to a multilayer ceramic electronic component and a method of manufacturing the same.

BACKGROUND

With the recent trend for the miniaturization of electronic products, multilayer ceramic electronic components are also required to be miniaturized and to have high capacity.

According to the related art, an external electrode paste is prepared by mixing a glass powder, a base resin, an organic solvent, and the like, with a conductive metal, dipping both end surfaces of a ceramic body into the external electrode paste, and sintering the dipped ceramic body.

Figure 5:
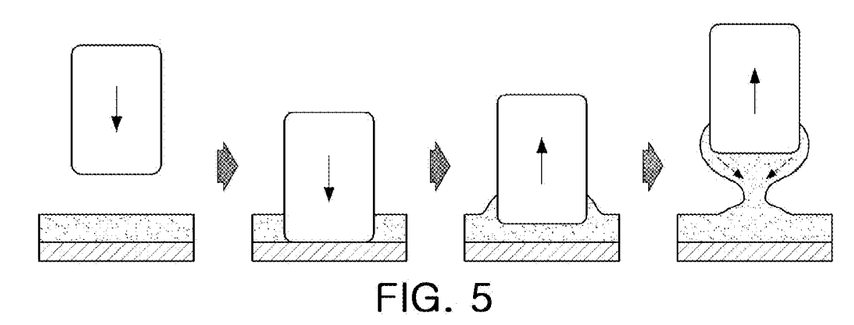
FIG. 5 is a schematic diagram illustrating a method of forming an external electrode using a dipping manner according to a related art.

FIG. 5 is a schematic diagram illustrating issues of a dipping method. When an external electrode is formed using the dipping method, it may be difficult to form an external electrode having a uniform thickness due to viscosity and surface energy of an external electrode paste, and a central portion of the external electrode protrudes or an inflected portion is formed in a bend portion.

In addition, when the external electrode is formed using the dipping method, an outermost external electrode is formed to have a low thickness, so that corner coverage performance is deteriorated. Moreover, an external material such as moisture, the like, may easily permeate therethrough, so that moisture resistance reliability may be deteriorated to lower the quality of a product.

SUMMARY

An aspect of the present disclosure is to provide a multilayer ceramic electronic component, capable of preventing an external electrode from being disconnected, and a manufacturing method thereof.

Another aspect of the present disclosure is to provide a multilayer ceramic electronic component, capable of reducing a thickness of a band portion of an external electrode, and a manufacturing method thereof.

Another aspect of the present disclosure is to provide a multilayer ceramic electronic component, capable of securing moisture resistance reliability while thinning an external electrode, and a method of manufacturing the same.

According to an aspect of the present disclosure, a multilayer ceramic electronic component includes a ceramic body having fifth and sixth surfaces opposing each other in a first direction, third and fourth surfaces opposing each other in a second direction, and first and second surfaces opposing each other in a third direction, and a capacitance forming portion including dielectric layers and first and second internal electrodes laminated with respective dielectric layers interposed therebetween in the third direction, a first external electrode connected to the first internal electrode and including a first conductive layer and a first band portion, and a second external electrode connected to the second internal electrode and including a second conductive layer and a second band portion. Tb/Tc is 0.85 or more, where Tc is a maximum thickness of each of the first and second conductive layers and Tb is a maximum thickness of each of the first and second band portions.

According to an aspect of the present disclosure, a method of manufacturing a multilayer ceramic electronic component includes transferring a conductive sheet to both surfaces of a ceramic body, including dielectric layers and first and second internal electrodes laminated with respective dielectric layers interposed therebetween in a third direction, in a first direction to form first and second conductive layers, and dipping both surfaces of the ceramic body in the first direction into a conductive paste to form first and second external electrodes, respectively including first and second band portions.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

In the drawings, the X direction may be defined as a first direction, an L direction, or a longitudinal direction, the Y direction may be defined as a second direction, a W direction, or a width direction, and the Z direction may be defined as a third direction, a T direction, or a thickness direction.

Referring to FIGS. 1 to 4, a multilayer ceramic electronic component according to an embodiment will be described in detail.

A multilayer ceramic electronic component 100 of this application includes a ceramic body 110 having fifth and sixth surfaces S5 and S6 opposing each other in a first direction (an X direction), third and fourth surfaces S3 and S4 opposing each other in a second direction (a Y direction), and first and second surfaces S1 and S2 opposing each other in a third direction (a Z direction), and a capacitance forming portion including dielectric layers 111 and first and second internal electrodes 121 and 122 laminated with respective dielectric layers 111 interposed therebetween in the third direction (the Z direction), a first external electrode 131 connected to the first internal electrode 121 and including a first conductive layer 131a and a first band portion 131b, and a second external electrode 132 connected to the second internal electrode 122 and including a second conductive layer 132a and a second band portion 132b.

In this case, Tb/Tc may be 0.85 or more, where Tc is a maximum thickness of each of the first and second conductive layers 131a and 132a and Tb is a maximum thickness of each of the first and second band portions 131b and 132b. In this application, the maximum thickness of each of the first and second conductive layers 131a and 132a may refer to a maximum value of a length of each of the sintered first and second conductive layers 131a and 132a in the X direction, may be a value measured in, for example, a center of each of the first and second conductive layers 131a and 132a. In one example, the maximum thickness of each of the first and second conductive layers 131a and 132a may be a value including a thickness of a plating layer to be described later. In this application, the maximum thickness of each of the first and second band portions 131b and 132b may refer to a maximum value of a length, in the Z direction, of each of the sintered first and second band portions 131b and 132b on the third surface S3 or on the fourth surface S4, or a maximum value of a length, in the Z direction, of each of the sintered first and second band portions 131b and 132b on the first surface S1 or on the second surface S2. In one example, the maximum thickness of each of the first and second band portions 131b and 132b may be a value including a thickness of a plating layer to be described later. External electrodes, formed by a dipping method according to the related art, have a limitation in which each of the external electrodes, formed on fifth and sixth surfaces of a ceramic body, has a large thickness or an electrode is formed again on a conductive layer by the dipping method to increase a thickness of an external electrode in a first direction. Meanwhile, in the multilayer ceramic electronic component 100 of this application, the first and second band portions 131b and 132b may be uniformly formed while significantly reducing a thickness of each of the first and second external electrodes 131 and 132 in the first direction (the X direction) through a process to be described later.

In an embodiment, the ceramic body 110 may include a capacitance forming portion including dielectric layers 111 and first and second internal electrodes 121 and 122 laminated with respective dielectric layers 111 interposed therebetween in the third direction (the Z direction).

A shape of the ceramic body 110 is not necessarily limited, but may be a hexahedral shape or a shape similar to a hexahedral shape, as illustrated in the drawings. Even in the case that the ceramic body 110 does not have a hexahedral shape having perfectly straight lines due to shrinkage of ceramic powder particles included in the ceramic body 110 in a sintering process, the ceramic body 110 may have a substantially hexahedral shape. The ceramic body 110 may have first and second surfaces S1 and S2 opposing each other in the thickness direction (the Z direction), third and fourth surfaces S3 and S4 connected to the first and second surfaces S1 and S2 and opposing each other in the width direction (the Y direction), and fifth and sixth surfaces S5 and S6 connected to the first and second surfaces S1 and S2 as well as to the third and fourth surfaces S3 and S4 and opposing each other in the length direction (the X direction).

The ceramic body 110 may be formed by alternately laminating a ceramic green sheet, in which a first internal electrode 121 is printed on a dielectric layer 111, and a ceramic green sheet, in which a second internal electrode 122 is printed on a dielectric layer 111, in the thickness direction (the Z direction).

Figure 3:
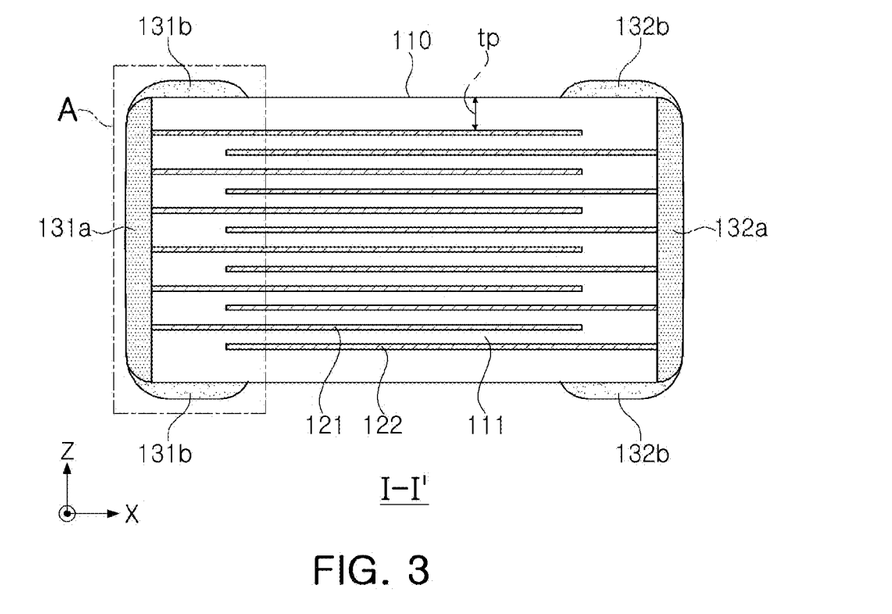
FIG. 3 is a cross-sectional view taken along line I-I' in FIG. 1.
Figure 4:
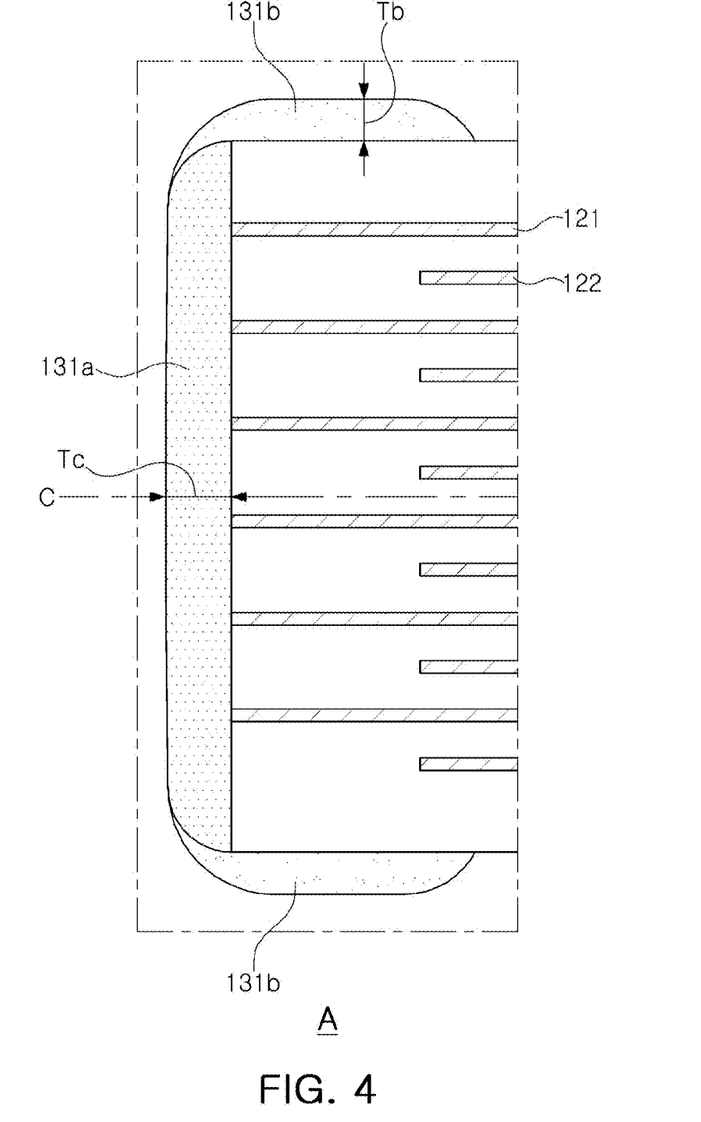
FIG. 4 is an enlarged view of region A in FIG. 3.

The capacitance forming portion may include dielectric layers 111 and internal electrodes 121 and 122 alternately laminated in the third direction. The plurality of dielectric layers 111, forming the capacitance forming portion, may be in a sintered state, and adjacent dielectric layers 111 may be integrated with each other so that boundaries therebetween are not readily apparent without using a scanning electron microscope (SEM).

According to an embodiment, a raw material of the dielectric layer 111 is not necessarily limited as long as sufficient capacitance may be obtained therewith. For example, the raw material of the dielectric layer 111 may be a barium titanate-based material, a lead complex Perovskite-based material, a strontium titanate-based material, or the like.

In addition, a material of the dielectric layer 111 may be prepared by adding various ceramic additives, organic solvents, plasticizers, binders, dispersants, and the like, to powder particles such as barium titanate ($BaTiO_3$) powder particles, or the like, according to an object of the present disclosure.

For example, the dielectric layer 111 may be formed by applying and drying slurry including powder particles such as barium titanate ($BaTiO_3$) powder particles, or the like, on a carrier film, to prepare a plurality of ceramic sheets. The ceramic sheet may be formed by mixing ceramic powder particles, a binder, and a solvent to prepare slurry, and forming the slurry into a sheet having a thickness of several micrometers (μm) using a doctor blading method, but a method of forming the dielectric layer 111 is not limited thereto.

As an example, an average thickness of the dielectric layer 111 may be 0.4 μm or less. A thickness of the dielectric layer 111 may refer to a thickness of any one dielectric layer in the third direction. The average thickness of the dielectric layer 111 may be an average of values measured in, for example, five different locations of the sintered dielectric layer 111. A lower limit of the average thickness of the dielectric layer 111 is not necessarily limited, but may be, for example, 0.01 μm or more.

In the multilayer ceramic electronic component of this application, a plurality of internal electrodes 121 and 122 may be disposed to oppose each other with respective dielectric layers 111 interposed therebetween. The internal electrodes 121 and 122 may include first and second internal electrodes 121 and 122 alternately disposed to oppose each other with respective dielectric layers 111 interposed therebetween.

The first internal electrode 121 may be exposed to one surface of the ceramic body 110 in the first direction (the X direction), and a portion exposed to the one surface in the first direction (the X direction) may be connected to the first conductive layer 131*a* of the first external electrode 131. The second internal electrode 122 may be exposed to the other surface of the ceramic body 110 in the first direction (the X direction), and a portion exposed to the other surface in the first direction (the X direction) may be connected to the second conductive layer 132*a* of the external electrode 132. The first and second internal electrodes 121 and 122 may be electrically isolated from each other by the dielectric layer 111 disposed therebetween.

An average thickness of each of the first and second internal electrodes 121 and 122 may be 0.4 μm or less. A thickness of each of the first and second internal electrodes 121 and 122 may refer to a thickness of any one internal electrode in the third direction (the Z direction). The average thicknesses of the first and second internal electrodes 121 and 122 may be an average of values measured in, for example, five different positions of the sintered internal electrodes. The measurement may be performed in a different way appreciated by one skilled in the art. A lower limit of the average thickness of each of the first and second internal electrodes 121 and 122 is not necessarily limited, but may be, for example, 0.01 μm or more.

A material, forming the first and second internal electrodes 121 and 122, is not necessarily limited. For example, the first and second internal electrodes 121 and 122 may be formed using a conductive paste including at least one of silver (Ag), gold (Au), platinum (Pt), nickel (Ni), copper (Cu), tin (Sn), tungsten (W), palladium (Pd), titanium (Ti), and alloys thereof. A method of printing the conductive paste may be a screen-printing method or a gravure printing method, but is not limited thereto.

The multilayer ceramic electronic component 100 of this application may include cover portions c1 and c2. The cover portions c1 and c2 may be disposed on outermost sides of the first and second internal electrodes 121 and 122. The cover portions c1 and c2 may be disposed below a lowermost internal electrode of the ceramic body 110 and above an uppermost internal electrode of the ceramic body 110. In this case, the cover portions c1 and c2 may have the same composition as the dielectric layer 111, and may be formed by laminating at least one dielectric layer, not including an internal electrode, above the uppermost internal electrode of the ceramic body 110 and below the lowermost internal electrode of the ceramic body 110. The cover portions c1 and c2 may basically serve to prevent damage, caused by a physical or chemical stress, to the internal electrode.

Each of the cover portions c1 and c2 may have a thickness tp, for example, 25 μm or less. A lower limit of the thickness of each of the cover portions c1 and c2 is not necessarily limited, but may be, for example, 1 μm or more.

Figure 2:
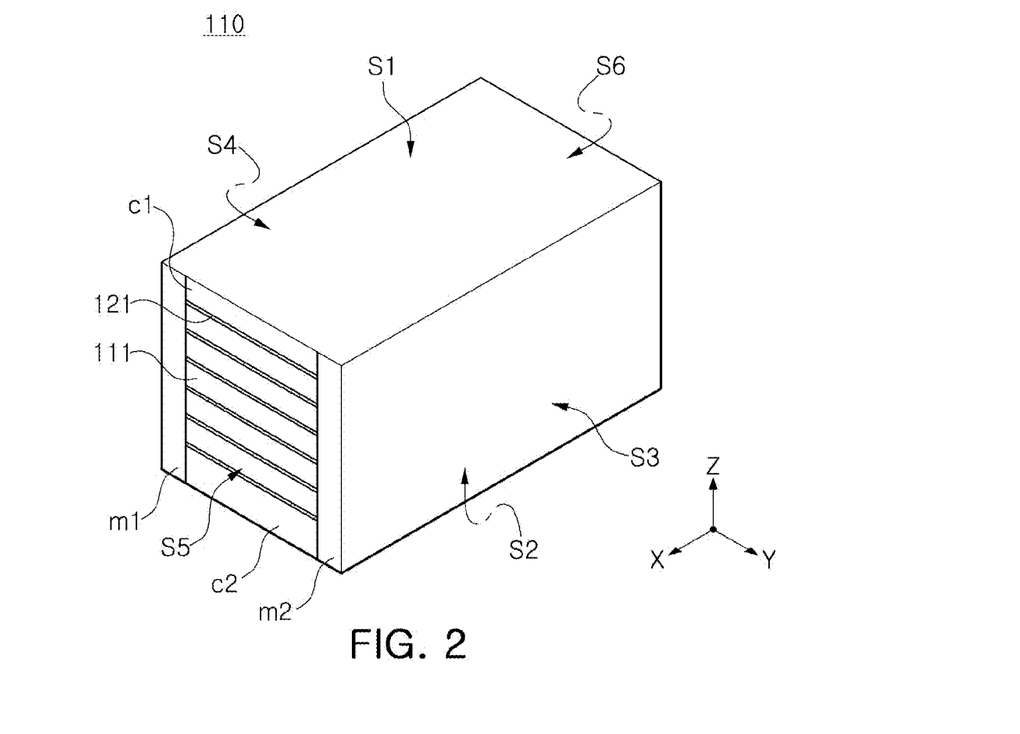
FIG. 2 is a schematic perspective view of a ceramic body of a multilayer ceramic electronic component according to an embodiment of the present disclosure.

In the multilayer ceramic electronic component of this application, margin portions m1 and m2 may be disposed on both surfaces of the ceramic body 110 in the second direction. The margin portions m1 and m2 may be disposed on both surfaces of the ceramic body 110 in the second direction (the Y direction) perpendicular to the first and third directions (the X and Z directions), respectively. The margin portions m1 and m2 may serve to prevent damage, caused by a physical or chemical stress, to the internal electrode.

The margin portions m1 and m2 may be formed of an insulating material, and may be formed of a ceramic material such as barium titanate, or the like. In this case, the margin portion may include the same ceramic material as that included in the dielectric layer 111 or may be formed of the same material as the dielectric layer 111.

A method of forming the margin portions m1 and m2 is not necessarily limited. For example, the dielectric layer, included in the ceramic body 110, is formed to have an area larger than an area of the internal electrode, and thus, a margin portion region may be formed in a circumferential portion of the internal electrode except for a portion of the internal electrode connected to the external electrode. Alternatively, the margin portion may be formed by applying slurry including ceramic or by attaching a dielectric sheet to both surfaces of the ceramic body 110 in the second direction (the Y direction).

Figure 1:
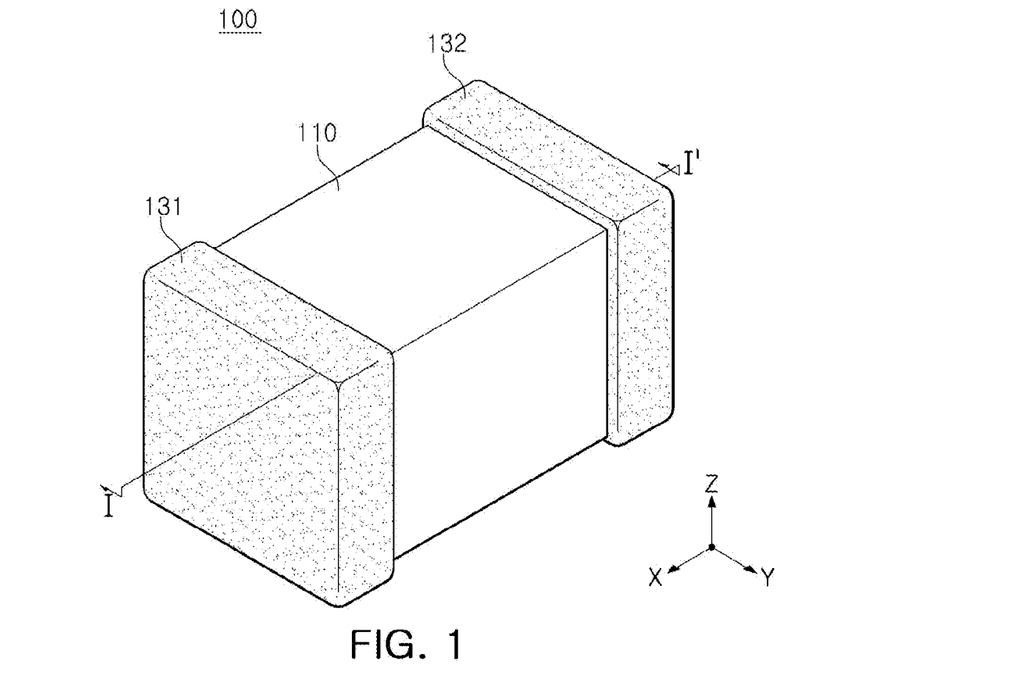
FIG. 1 is a schematic perspective view of a multilayer ceramic electronic component according to an embodiment of the present disclosure.

The multilayer ceramic electronic component 100 of this application may include a first external electrode 131, connected to the first internal electrode 121, and a second external electrode 132 connected to the second internal electrode 122. The first external electrode 131 may include a first conductive layer 131a and a first band portion 131b. The first conductive layer 131a may be disposed on the fifth surface S5 of the ceramic body 110, and the first band portion 131b may be connected to the first conductive layer 131a to be disposed on the first surface S1 to the fourth surface S4 of the ceramic body 110. In addition, the second external electrode 132 may include a second conductive layer 132a and a second band portion 132b. The second conductive layer 132a may be disposed on the sixth surface S6 of the ceramic body 110, and the second band portion 132b may be connected to the second conductive layer 132a to be disposed on the first surface S1 to the fourth surface S4 of the ceramic body 110.

The first external electrode 131 and the second external electrode 132 may be formed of a conductive paste including a conductive metal and a glass. The first external electrode 131 and the second external electrode 132 may be sintered electrodes formed by sintering the conductive paste. The conductive metal, included in the first external electrode 131 and the external electrode 132, is not necessarily limited and may be at least one of, for example, copper (Cu), nickel (Ni), tin (Sn), palladium (Pd), platinum (Pt), gold (Au), silver (Ag), tungsten (W), titanium (Ti), lead (Pb), or alloys thereof.

The glass may be at least one selected from the group consisting of, for example, silicon (Si), boron (B), aluminum (Al), a transition metal, an alkali metal, an alkaline earth metal, an oxide nitride, a carbide, and a carbonate, but is not limited thereto. The transition metal may be at least one selected from the group consisting of zinc (Zn), titanium (Ti), copper (Cu), vanadium (V), manganese (Mn), iron (Fe), and nickel (Ni). The alkali metal may be at least one selected from the group consisting of lithium (Li), sodium (Na), and potassium (K). The alkaline earth metal may be at least one selected from the group consisting of magnesium (Mg), calcium (Ca), strontium (Sr), and barium (Ba).

According to an embodiment, the first and second conductive layers 131a and 132a may be formed by transferring a conductive paste sheet. A dipping method or an applying method, a common method of forming an external electrode, has difficulty in forming a head surface of an external electrode to have a uniform thickness, and suffers from poor corner coverage. Meanwhile, in the multilayer ceramic electronic component of this application, each of the first and second conductive layers 131a and 132a may be formed by a transfer method to have a uniform thickness, and the first and second conductive layers may be evenly formed up to a corner portion of the ceramic body 110.

In an embodiment, each of the first and second conductive layers 131a and 132a may have an average thickness of 15 µm or less. A thickness of each of the first and second conductive layers 131a and 132a may refer to a thickness of any one conductive layer in the first direction. The average thickness of each of the first and second conductive layers 131a and 132a may be an average of values measured in, for example, five different locations of the sintered first and second conductive layers 131a and 132a, and may be a value including a thickness of a plating layer to be described later. A lower limit of the average thickness of each of the first and second conductive layers 131a and 132a may be, for example, 3 µm or more, but is not limited thereto.

In an embodiment, a difference T0−t may be 12 µm or less, where T0 and t are a maximum thickness and a minimum thickness of each of the first and second conductive layers 131a and, respectively. Since the first and second conductive layers 131a and 132a are formed by transferring a conductive paste sheet, each of the first and second conductive layers 131a and 132a may have a uniform thickness. Thus, the difference between the maximum thickness and the minimum thickness may be small. A lower limit of the difference is not necessarily limited, but may be, for example, 3 µm or more.

In another embodiment, the first and second band portions 131b and 132b may be formed by dipping the ceramic body 110 in a conductive paste. Referring to FIG. 5, when the fifth surface S5 of the ceramic body 110 is dipped into the conductive paste, a first band portion 131b is formed but a large amount of the conductive paste remains on one surface of the ceramic body 110 to cause a head surface to have a large thickness. When the conductive paste remaining on the fifth surface S5 of the ceramic body 110 is removed, the conductive paste in a location corresponding to the first band portion 131b is formed to have an even surface, and a conductive paste remaining in a corner portion of the fifth surface S5 of ceramic body 110 remains. Since the first conductive layer 131a is disposed on the fifth surface S5 of the ceramic body 110, the first external electrode 131 of the ceramic body 110 may be formed through a sintering process. In addition, the second external electrode 132 may be formed by dipping the sixth surface S6 of the ceramic body 110 in the same manner and removing an excessive amount of the conductive paste. The first and second band portions 131b and 132b may be formed in the above manner, so that each of the first and second conductive layers 131a and 132a and the first and second band portions 131b and 132b may be formed to have a small and uniform thickness and a thickness variation of the first and second conductive layers 131a and 132a and the first and second band portions 131b and 132b may be reduced.

In an embodiment, each of the first and second band portions 131b and 132a may have an average thickness of 14 µm or less. A thickness of each of the first and second band parts 131b and 132b may refer to a thickness of any one band portion in the second direction or the third direction. The average thickness of each of the first and second band portions 131b and 132b may be an average of values measured at, for example, five different locations of the fired first and second band portions 131b and 132b and may be a value including a thickness of a plating layer to be described later. A lower limit of the average thickness of each of the first and second band portions 131b and 132b may be, for example, 3 µm or more, but is not limited thereto.

As an example, a secondary differential value with respect to a tangent of each of the first and second band portions 131b and 132b of the multilayer ceramic electronic component of this application may be a constant. The constant may be a value excluding zero, and may be a positive number or a negative number. The tangents of the first and second band portions 131b and 132b may be values calculated on the basis of coordinates when an X-axis is present on one of the first to fourth surfaces of the ceramic body in the case in which the second direction or the third direction is a Y-axis. The sentence "a secondary differential value with respect to tangents of the first and second band portions 131b and 132b is a constant" may mean that tangents of surfaces of the first and second band portions 131b and 132b is constantly changed in either one of a clockwise direction and a counterclockwise direction, and may mean that there is no inflection point.

Figure 6:
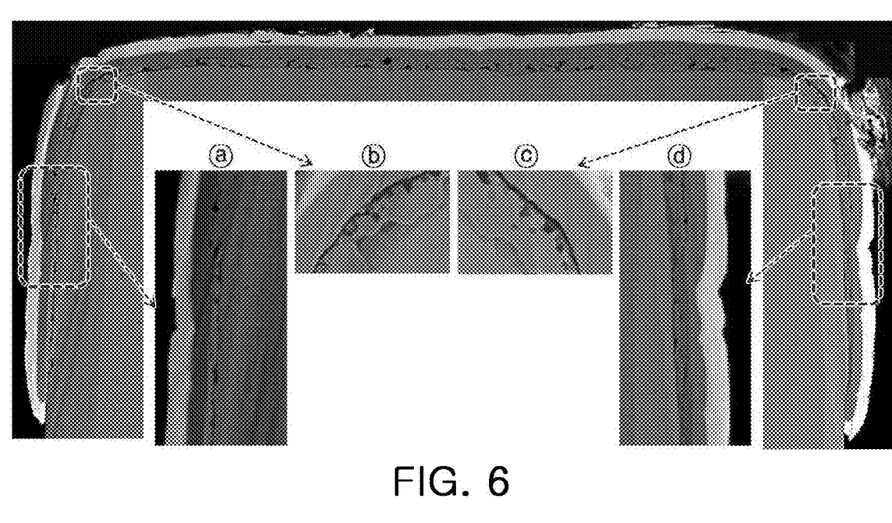
FIG. 6 is an SEM image of an external electrode according to a Comparative Example of the present disclosure.

FIG. 6 is an image obtained by capturing a cross section of a multilayer ceramic electronic component in which an external electrode is formed using a dipping method according to the related art.

As can be seen from FIG. 6, an inflection point appears in region ⓓ. In the case of the dipping method according to the related art, as illustrated in FIG. 6, an inflection point is easily formed, and a thickness of a band portion may be increased and a corner portion may be disconnected. The multilayer ceramic electronic component of this application may address the above-described issues due to the band portion having no inflection point.

As an example, a plating layer may be disposed on the first and second external electrodes 131 and 132 of the multilayer ceramic electronic component of this application. The plating layer may be formed to include a single layer or a plurality of layers. The plating layer may include one or more materials among silver (Ag), palladium (Pd), gold (Au), platinum (Pt), nickel (Ni), copper (Cu), tin (Sn), and tungsten (W), palladium (Pd), titanium (Ti), and alloys thereof, but a material of the plating layer is not limited thereto. The plating layer may be formed by sputtering or electric deposition, but a method of forming the plating layer is not limited thereto.

This application also relates to a method of manufacturing a multilayer ceramic electronic component 100. The method of manufacturing the multilayer ceramic electronic component 100 according to an embodiment may include transferring a conductive sheet to both surfaces of a ceramic body 110, including dielectric layers 111 and first and second internal electrodes 121 and 122 laminated with respective dielectric layers 111 interposed therebetween in a third direction (a Z direction), in a first direction (an X direction) to form first and second conductive layers 131*a* and 132*a*, and dipping both surfaces of the ceramic body 110 in the first direction (the X direction) into a conductive paste to form first and second external electrodes 131 and 132, respectively including first and second band portions 131*b* and 132*b*. The ceramic body 110 may be sintered through calcination and sintering processes.

As an example, the method of manufacturing a multilayer ceramic electronic component 100 of this application may include removing the conductive paste on a fifth surface S5 and a sixth surface S6 of the ceramic body 110.

As an example, the method of manufacturing a multilayer ceramic electronic component 100 of this application may further include sintering the first and second external electrodes 131 and 132.

The dielectric layer, the internal electrode, the ceramic body, and the conductive paste are the same those described above, and thus, detailed description thereof will be omitted.

This application will be described in more detail in the embodiment below. However, the embodiment is set forth to illustrate but is not to be construed to limit this application.

Embodiment

Table 1 shows data obtained by measuring thicknesses of head surfaces and band portions of external electrodes of a multilayer ceramic electronic component in which the external electrodes are disposed on both surfaces of a ceramic body, having a 1005 size and a cover thickness of 25 μm or less, in a first direction. The ceramic body of the multilayer ceramic electronic component used a barrel-polished chip, and the conductive paste for formation of an external electrode was a conductive paste including copper (Cu) as a conductive metal.

In the embodiment, the conductive paste was transferred to fifth and sixth surfaces of the ceramic body to form a head surface, and then the ceramic body was dipped into the conductive paste. The conductive paste on the head was removed and calcined to form an external electrode. As a result, a multilayer ceramic electronic component was manufactured. In Comparative Example, the multilayer ceramic electronic component was manufactured by dipping both surfaces of a prepared ceramic body in a first direction into a conductive paste.

TABLE 1

|  | Inventive Example | | | Comparative Example | | |
| --- | --- | --- | --- | --- | --- | --- |
|  | Band Portion | Conductive Layer | Tb/Tc | Band Portion | Conductive Layer | Tb/Tc |
| Average | 11.88 | 12.75 | 0.93 | 13.0 | 20.3 | 0.64 |
| Maximum | 13.11 | 14.39 |  |  |  |  |
| Minimum | 10.75 | 11.11 |  |  |  |  |
| 1 | 12.18 | 14.39 | 0.85 |  |  |  |
| 2 | 11.65 | 11.11 | 1.05 |  |  |  |
| 3 | 13.11 | 13.96 | 0.94 |  |  |  |
| 4 | 11.62 | 12.2 | 0.95 |  |  |  |
| 5 | 10.75 | 12.41 | 0.87 |  |  |  |
| 6 | 12.22 | 11.73 | 1.04 |  |  |  |
| 7 | 11.38 | 13.25 | 0.86 |  |  |  |
| 8 | 11.88 | 13.16 | 0.9 |  |  |  |
| 9 | 11.65 | 11.11 | 1.05 |  |  |  |
| 10 | 12.34 | 14.2 | 0.87 |  |  |  |

As can be seen in Table 1, the multilayer ceramic electronic component of this application satisfies Tb/Tc≥0.85, where Tb is a thickness of a band portion and Tc is a thickness of a head surface, and an external electrode had a uniform thickness. Meanwhile, in Comparative Example using a dipping method according to the related art, Tb/Tc=0.64 and there was a significant difference between a thickness of a head surface (Tc) and a thickness of a band portion (Tb).

Figure 7:
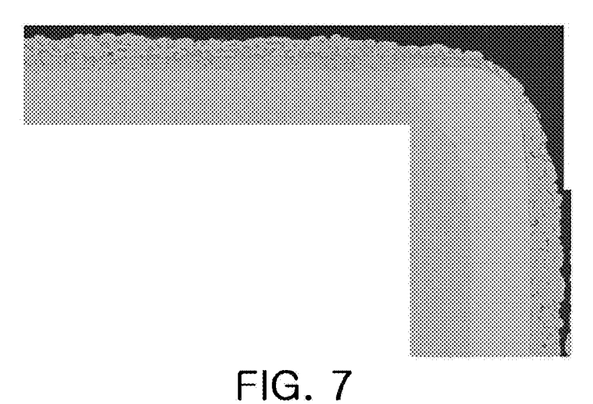
FIG. 7 is an SEM image of an external electrode according to an Inventive Example of the present disclosure.

FIG. 6 is a cross-sectional view of a multilayer ceramic electronic component manufactured using a method of Comparative Example, and FIG. 7 is a cross-sectional view of a multilayer ceramic electronic component of this application.

As can be seen in FIG. 6, an inflection point is found in a band portion (ⓐ and ⓓ), or connection of an external electrode in a corner portion is poor (ⓑ). Meanwhile, as can be seen in FIG. 7, there is no inflection point, and an electrode of a band portion extends to an edge and is connected to an electrode of a head surface. As a result, in the multilayer ceramic electronic component of this application, a band portion may be uniformly formed as compared with the related art, and an external electrode of a head surface may be formed to have a low thickness while preventing an edge portion from being disconnected.

As described above, according to an embodiment, a multilayer ceramic electronic component, capable of preventing an external electrode from being disconnected, and a method of manufacturing the same may be provided.

According to another embodiment, a multilayer ceramic electronic component, capable of reducing a thickness of a band portion of an external electrode, and a method of manufacturing the same may be provided.

According to another embodiment, a multilayer ceramic electronic component, capable of thinning an external electrode and securing moisture resistance reliability, and a method of manufacturing the same may be provided.

While example embodiments have been shown and described above, it will be apparent to those skilled in the art that modifications and variations could be made without departing from the scope of the present disclosure as defined by the appended claims.

What is claimed is:

1. A multilayer ceramic electronic component comprising: a ceramic body having fifth and sixth surfaces opposing each other in a first direction, third and fourth surfaces opposing each other in a second direction, and first and second surfaces opposing each other in a third direction, and a capacitance forming portion including dielectric layers and first and second internal electrodes laminated with respective dielectric layers interposed therebetween in the third direction; a first external electrode connected to the first internal electrode and including a first conductive layer and a first band portion extending from an edge of the first conductive layer overlapping the fifth surface in the first direction; and a second external electrode connected to the second internal electrode and including a second conductive layer and a second band portion extending from an edge of the second conductive layer overlapping the sixth surface in the first direction, wherein Tb/Tc is 0.85 or more, excluding 1, where Tc is a maximum thickness of each of the first and second conductive layers and Tb is a maximum thickness of each of the first and second band portions.

2. The multilayer ceramic electronic component of claim 1, wherein each of the first and second external electrodes includes a sintered electrode.

3. The multilayer ceramic electronic component of claim 1, wherein each of the first and second conductive layers has an average thickness of 15 μm or less.

4. The multilayer ceramic electronic component of claim 1, wherein each of the first and second band portions has an average thickness of 14 μm or less.

5. The multilayer ceramic electronic component of claim 1, wherein a secondary differential value with respect to a tangent of each of the first and second band portions is a constant.

6. The multilayer ceramic electronic component of claim 5, wherein the constant is less or greater than zero.

7. The multilayer ceramic electronic component of claim 1, wherein each of the first and second internal electrodes has an average thickness of 0.4 μm or less.

8. The multilayer ceramic electronic component of claim 1, wherein each of the dielectric layers has an average thickness of 0.4 μm or less.

9. The multilayer ceramic electronic component of claim 1, wherein the ceramic body includes cover portions, respectively disposed on both surfaces in the third direction, and each of the cover portions has a thickness of 20 μm or less.

10. The multilayer ceramic electronic component of claim 1, wherein the first conductive layer is disposed on the fifth surface,
the first band portion is disposed on one or more of the first to fourth surfaces,
the second conductive layer is disposed on the sixth surface, and
the second band portion is disposed on one or more of the first to fourth surfaces.

11. The multilayer ceramic electronic component of claim 1, wherein the first conductive layer is disposed directly on the fifth surface,
the first band portion is disposed directly on one or more of the first to fourth surfaces,
the second conductive layer is disposed directly on the sixth surface, and
the second band portion is disposed directly on one or more of the first to fourth surfaces.

12. A multilayer ceramic electronic component comprising:
a ceramic body having fifth and sixth surfaces opposing each other in a first direction, third and fourth surfaces opposing each other in a second direction, and first and second surfaces opposing each other in a third direction, and a capacitance forming portion including dielectric layers and first and second internal electrodes laminated with respective dielectric layers interposed therebetween in the third direction;
a first external electrode connected to the first internal electrode at the fifth surface and including a first conductive layer and a first band portion; and
a second external electrode connected to the second internal electrode at the sixth surface and including a second conductive layer and a second band portion,
wherein Tb/Tc is 0.85 or more, where Tc is a maximum thickness of each of the first and second conductive layers and Tb is a maximum thickness of each of the first and second band portions, and
wherein the first conductive layer and the first band portion have a first interface defined therebetween which extends to an exposed surface of the first conductive layer overlapping the fifth surface in the first direction, or the second conductive layer and the second band portion have a second interface defined therebetween which extends to an exposed surface of the second conductive layer overlapping the sixth surface in the first direction.

* * * * *